(12) United States Patent
Lackey et al.

(10) Patent No.: US 7,711,317 B2
(45) Date of Patent: May 4, 2010

(54) RESOURCE OPTIMIZED LIVE TO VIRTUAL COMMUNICATIONS

(75) Inventors: Stephanie Jane Lackey, Orlando, FL (US); David Mark Kotick, Orlando, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 546 days.

(21) Appl. No.: 11/879,526

(22) Filed: Jul. 9, 2007

(65) Prior Publication Data

US 2009/0017771 A1    Jan. 15, 2009

(51) Int. Cl.
*H04B 3/36* (2006.01)
(52) U.S. Cl. ......................................... 455/7; 455/452.2
(58) Field of Classification Search ...................... 455/7, 455/11.1, 13.1, 452.2, 453
See application file for complete search history.

(56) References Cited

U.S. PATENT DOCUMENTS 6,972,786 B1 * 12/2005 Ludwig .................. 348/14.11

OTHER PUBLICATIONS

Stephanie Jane Lackey, Prediction and Allocation of Live to Virtual Communication Bridging Resources, Fall 2006, Thesis, University of Central Florida, Orlando, Florida, USA.

* cited by examiner

*Primary Examiner*—Tu X Nguyen
(74) *Attorney, Agent, or Firm*—Eliot Abolafia; Mark D. Kelly; Mark O. Glut

(57) ABSTRACT

An exemplary embodiment of the invention relates to configuring the minimum number of relay radios in a live-virtual communications system for a tactical training event. The system includes live radios, virtual radios cooperating with a wide area network, and radio bridge circuits cooperating between the live radios and the wide area network. A number of relay radios is determined by determining the mean transmission length for the tactical training event. The duration of peak performance and the expected number of transmissions for the tactical training event are determined. The number of radios for the traffic capacity is calculated, which incorporates a QoS and a spare capacity.

19 Claims, 5 Drawing Sheets

| | | Number of Bridged Circuits | | | |
|---|---|---|---|---|---|
| | | 1 - 10 | 11 - 20 | 21 - 30 | 31 - 40 |
| Peak Period Duration (hours) | 2 | ///// | ::::: | ::::: | ::::: |
| | 3 | ///// | | | |
| | 4 | ///// | | | |
| | 5 | ///// | ≡≡≡ | ≡≡≡ | ≡≡≡ |
| | 6 | ///// | ≡≡≡ | ≡≡≡ | ≡≡≡ |

Key
- ///// Number of relay radios = number of L-V bridges
- ::::: Use 3 hour prediction values
- ☐ Traffic capacity calculation only
- ☐ Traffic capacity calculation +30% spare capacity
- ≡≡≡ Use 4 hour prediction values

RESOURCE OPTIMIZED LIVE TO VIRTUAL COMMUNICATIONS

CROSS-REFERENCE TO RELATED APPLICATIONS

None

STATEMENT REGARDING FEDERALLY SPONSORED RESEARCH OR DEVELOPMENT

Not Applicable

REFERENCE TO A SEQUENCE LISTING, A TABLE OR A COMPUTER PROGRAM LISTING APPENDIX SUBMITTED ON A COMPACT DISK

None

BACKGROUND OF THE INVENTION

1. Field of the Invention

This invention relates to the field of communications and more particularly to voice and data communications in integrated digital network-analog radio tactical training environments.

2. Description of the Related Art

The ability to bridge live and virtual (L-V) radio networks is of particular interest in large scale training environments, particularly in the military training community.

FIG. 1 illustrates a typical large scale training environment 10 incorporating L-V communications. L-V systems are characterized by three components: live communication devices 12, virtual communication devices 14, and a means to bridge voice and data between live and virtual communication devices 16, for example dedicated communications circuits. As used herein, "live communications device" is an analog radio, such as a tactical radio (also referred to alternatively herein as a "live radio"), and is typically located with field resources. Live participants engage in a training exercise using the representative analog radio communications that are anticipated to be used during actual situations. In particular training environments, virtual radio equipment may also be used, for example, to train command and control skills, and may be housed within a training facility 18. If a training exercise requires operators of live and virtual equipment to communicate, a set of the communication circuits is required to be dedicated for that purpose. Other circuits may also be defined as well for transmissions among exclusively live or exclusively virtual radios.

Referring to FIG. 2 and FIG. 3, multiple live radios 20 linked to multiple virtual radios 22 residing on a wide area network (WAN) 24 through radio bridge circuits 26 are illustrated. Each radio bridge circuit dedicated to L-V communications comprises a relay radio 28 and a Live Radio Bridge (LRB) 30. Live radios operate at specific radio frequencies (RF) 32, whereas virtual radios 22 communicate digitally over a wide area network (WAN) 24. The relay radio of each radio bridge circuit operates on one dedicated RF frequency, corresponding to the capabilities of the live radios. The relay radio transmits and receives voice and data through analog transmissions. The LRB converts analog voice and data signals received from the relay radio from analog to digital, and conversely converts voice and data from the WAN to analog for receipt by the relay radio.

It can be appreciated that the number of live communication devices and virtual radios determines the number of number of required relay radios and bridges, thereby increasing the required costs to conduct complex exercises. However, until now there has not been a method for optimizing the number of required radio bridge circuits for voice and data communications in integrated digital network-analog radio tactical training environments. In addition, each relay radio needed for training is equipment that is unavailable for use by another trainee or for operations.

Unfortunately, the current L-V communication configuration is static by nature. Relay radios must be tuned to their assigned L-V circuit prior to exercise execution, and cannot be reconfigured without human interaction. This limits the level of realism injected into tactical communications training events. Thus, current LRB configurations address a subset of the LVC communication requirements, but present difficulties that impact resource availability, cost, and training realism. There is therefore a need to reduce the number of radios required to support L-V communications within an LVC training environment without negatively affecting quality of service (QoS).

BRIEF SUMMARY OF THE INVENTION

Figure 1:
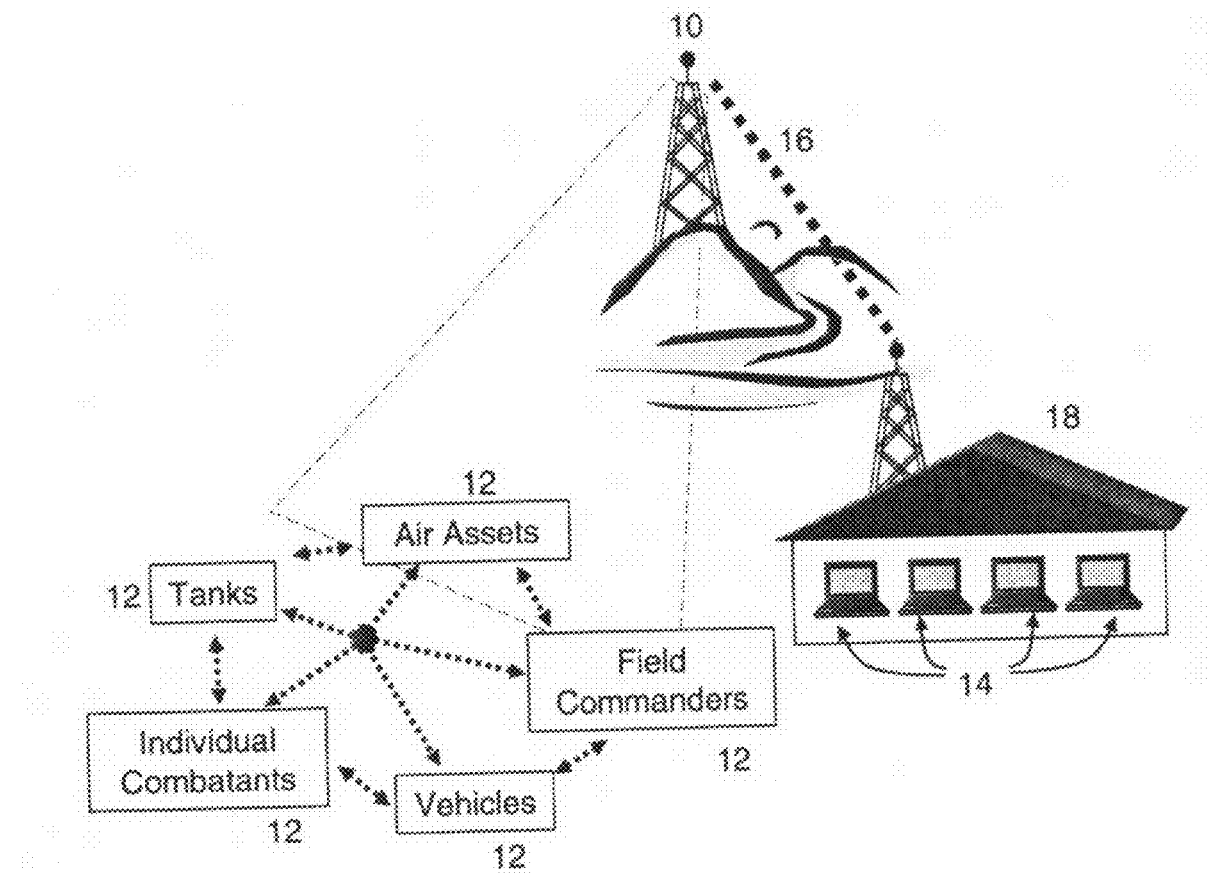
FIG. 1 is an exemplary illustration of a training system that includes live and virtual communications.
Figure 2:
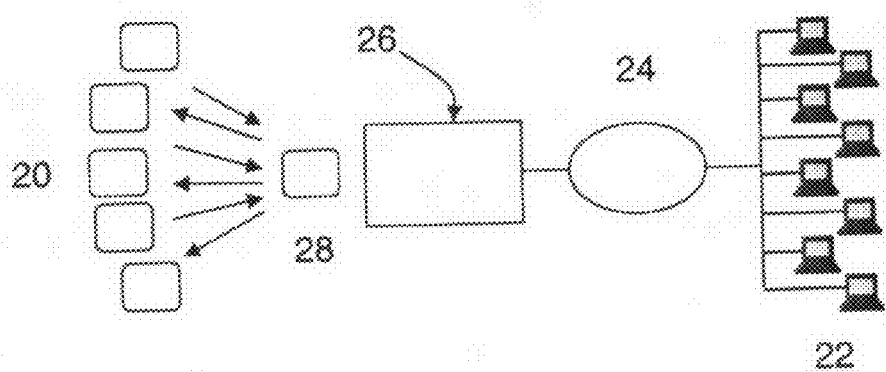
FIG. 2 is an exemplary illustration of individual cooperating elements for L-V communications.

It is an object of the invention to minimize the number of relay radios used in L-V communications networks.

It is another object of the invention to predict the number of relay radios needed to support a predetermined QoS.

It is a further object of the invention to efficiently allocate relay radios in order to minimize the cost of training.

It is yet another object of the invention to provide a live virtual communications system where the QoS is 0% loss.

An exemplary aspect presents a method for configuring the minimum number of relay radios in a live virtual communications system for a tactical training event. The system includes live radios, a wide area network, virtual radios cooperating with the wide area network, and a multiplicity of radio bridge circuits cooperating between each live radio and the wide area network. Each radio bridge circuit further comprises one relay radio and one bridge circuit. The number of relay radios is determined by determining the mean transmission length for the tactical training event. The duration of peak performance for the tactical training event is determined. The expected number of transmissions for the tactical training event is determined. Using the algorithm $$E_n(\alpha) = \frac{\alpha E_{n-1}(\alpha)}{n + \alpha E_{n-1}(\alpha)},$$

the number of radios for the traffic capacity is calculated. A QoS is specified and a spare capacity is specified.

Another aspect is a virtual communications system for a tactical training event comprises between 11 and 40 radio bridge circuits where each radio bridge circuit includes a relay radio. The system is capable of operating for a peak duration between 3 and 6 hours with a QoS of 0% loss, and the minimum number of relay radios is determined by the relationship, $$E_n(\alpha) = \frac{\alpha E_{n-1}(\alpha)}{n + \alpha E_{n-1}(\alpha)}.$$

These and other features and advantages of the present invention may be better understood by considering the following detailed description of certain preferred embodiments. In the course of this description, reference will frequently be made to the attached drawings.

DETAILED DESCRIPTION OF THE INVENTION

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

The exemplary embodiment disclosed herein relates to the application of classical models for predicting telephone traffic capacity and network utilization. The novelty residing in the embodiment is the development of classical models that are herein applied to tactical L-V communications. The novel, unexpected and unobvious results flow from the difference between teletraffic and crisis/tactical communication events because telephone conversations are bi-directional and tactical communications are uni-directional. In telephony systems, each communication event represents a bi-directional conversation between users. Within tactical environments, a communication event equates to a single transmission sent by one user and received by many users. A conversation is comprised of an arbitrary number of transmissions between multiple users.

Theoretically, unidirectional communications within tactical environments violates the independence assumptions of Poisson arrival processes, which forms the basis of the classical model. If a conversation consists of multiple transmissions, then the number of transmissions in a given time interval is not independent. For example, some tactical maneuvers require more intense coordination, and thus more frequent communication between users.

Figure 4:
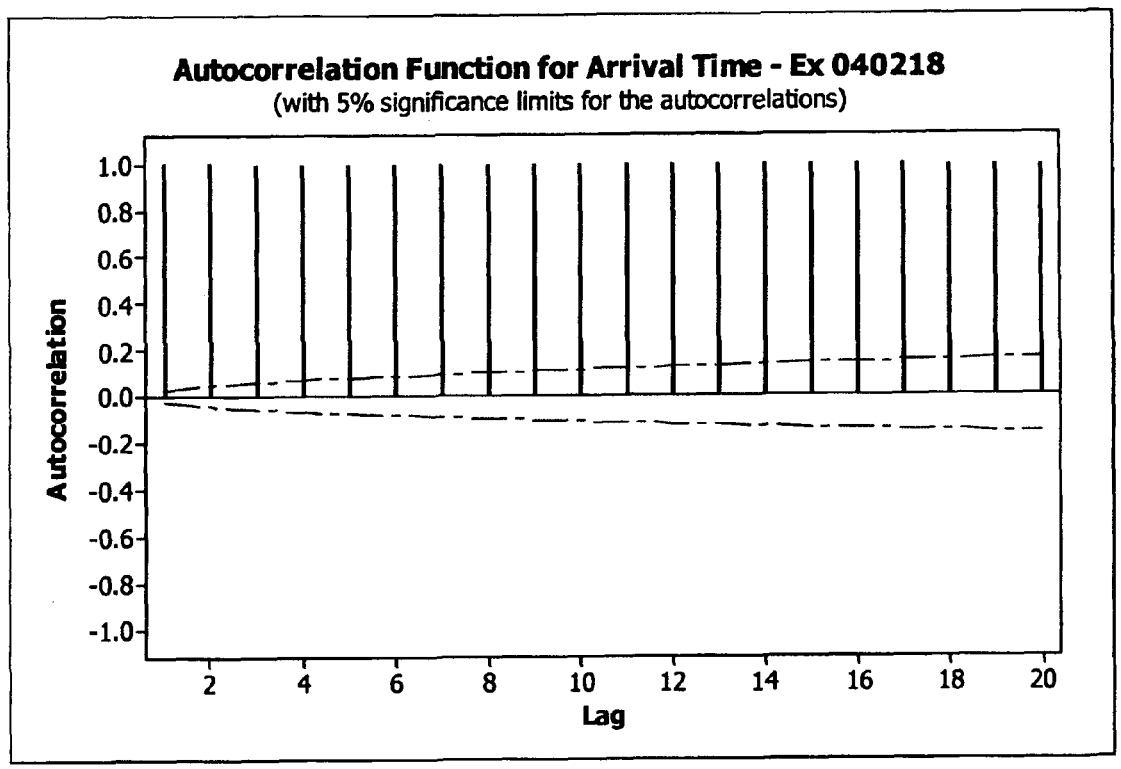
FIG. 4 is plot of autocorrelation versus lag of arrival times for an exemplary exercise.
Figure 5:
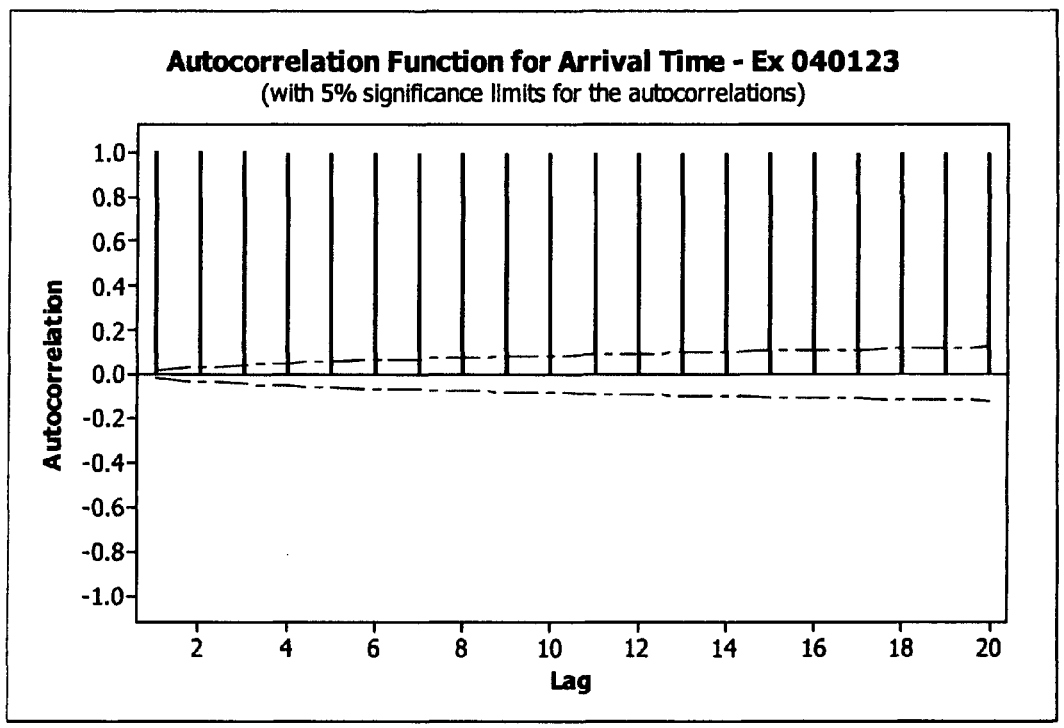
FIG. 5 is plot of autocorrelation versus lag of arrival times for an exemplary exercise.

Referring to FIG. 4 and FIG. 5 examination of communications data collected during multiple LVC military exercises illustrates significant autocorrelation between the arrival times of transmissions. Discrete event simulation (DES) confirms a significant difference between model performance when using input models derived from empirical data and input models based upon a Poisson arrival process. The 95% confidence interval resulting from the comparison of the maximum number of simultaneous transmission for the two alternative arrival processes was (3.9692, 4.6941). A statistical test for the difference in means yielded a p-value of 0.000 at a α level of 0.05.

The motivation for transmitting messages also contributes to disparities. Catalysts for message transmissions that involve disaster and combat events that are inherently more stressful than typical telephone conversations. Aside from behavioral characteristics of voice transmissions, QoS (defined hereinbelow) standards impact the logistical constraints of LVC training environments. The nature of LVC training introduces the possibility of physical harm to participants. QoS standards are mandated to not only facilitate effective training, but to ensure the greatest level of safety for all participants involved: Loss of transmissions due to relay radio or "trunk" resource availability is unacceptable.

Therefore, it is to be appreciated that communications traffic during crisis and tactical events are significantly different from commercial telephony environments. The core characteristics of tactical communications that impact DES input models are the uni-directional nature of transmissions, the motivation for transmissions, and the QoS criteria. These differences result in novel opportunities to extend the application of classic telephony forecasting techniques to a new field: tactical communications training in LVC environments.

It would be useful to discuss the meanings of some words used herein and their applications before discussing the method and embodiment of the present invention including:

"Traffic Capacity" is the maximum traffic per unit of time that a communications network or system can successfully carry under specified conditions.

"Denial of Service" (hereinafter DoS) or "Blocking" is when an incoming call is denied service (busy signal) or placed in a queue to wait for service. DoS is due to the lack of available servers or resources. DoS is expressed as a percentage of denied calls. A blocking probability of 1-2 percent is traditionally deemed to be an adequate Quality of Service (QoS) for loss-systems In a loss system, incoming calls are blocked rather than rerouted, put on hold, or retried if there are no available trunk communication lines.

"Call Holding Time" (also known as "call length") is the length of time that a communications resource, for example, server, circuit, wireless frequency, etc. services the user. Holding time may also include overhead or queuing time.

Figures 6, 7:
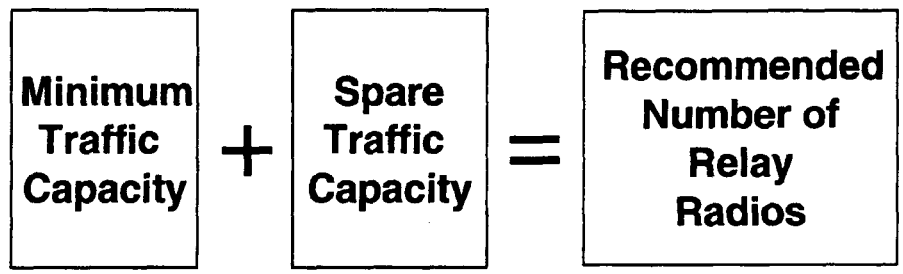
FIG. 6 is a block diagram of the exemplary embodiment.
FIG. 7 is a table illustrating the relevant application for the exemplary embodiment.

Referring to FIG. 6 an illustrated embodiment will now be described. In the exemplary method, minimum traffic capacity is determined through adaption of classical methods. Spare traffic capacity is determined, and then the number of relay radios for use in the network is determined.

Minimum Traffic Capacity

Figure 3:
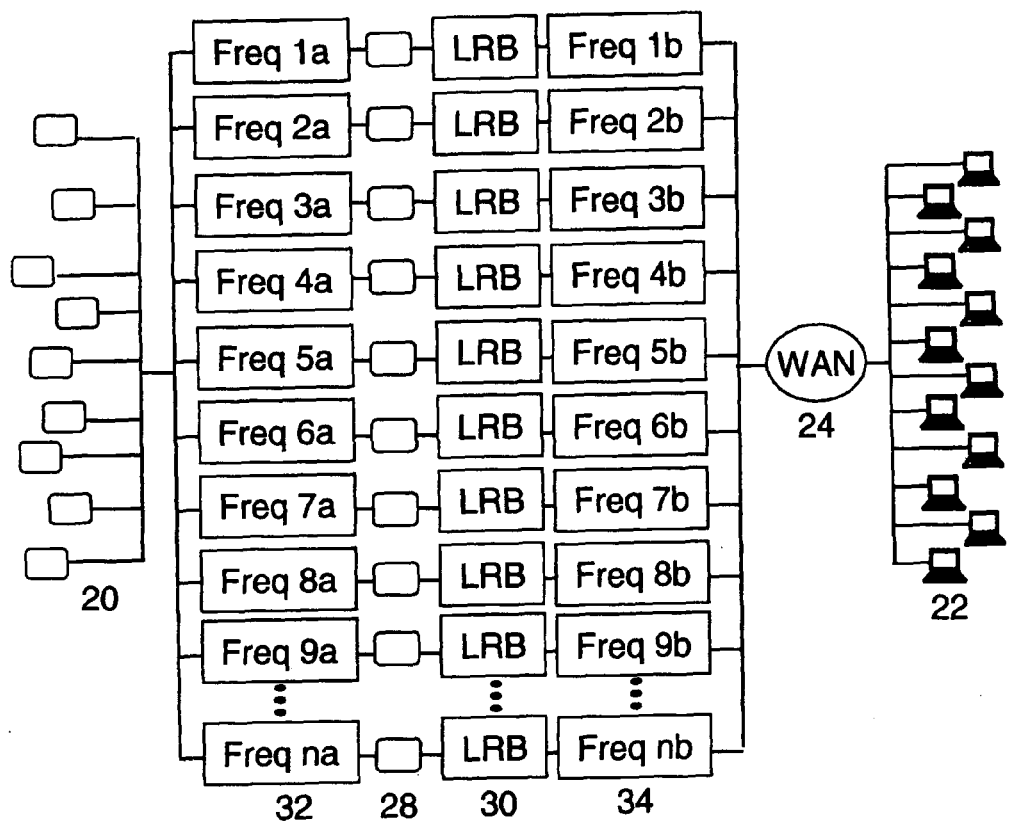
FIG. 3 is an exemplary illustration of a typical L-V communications system or network.

The minimum traffic capacity is determined with reference to the QoS, peak period length, the number of L-V bridges, the number of transmissions and the traffic capacity table. Referring again to FIG. 3, it can be appreciated that the role of relay radios in the architecture may be analogized to trunk lines within a wire line telecommunications network. Thus, the well-known Erlang loss formula affords insight into the minimum number of relay radios required to accommodate the maximum number of simultaneous transmissions during a LVC exercise.

A recursive adaptation of the Erlang B loss formula is given by Equation 1:

$$E_n(\alpha) = \frac{\alpha E_{n-1}(\alpha)}{n + \alpha E_{n-1}(\alpha)} \tag{1}$$

Where: $E_n(\alpha)$=percent of calls lost due to lack of availability $\alpha$=traffic intensity n=number of resources The number of resources, N, required to meet the QoS criterion is developed by creating a traffic capacity table using Equation 1. The traffic intensity, α results from the product of the arrival rate of transmissions, λ and the mean transmission length, m. Arrival rate is calculated by dividing the number of transmissions, x, by the length of the peak performance period, t.

In order to predict the minimum resource requirements for a particular LVC training event, the mean transmission length, duration of peak performance, and expected number of transmissions are used to create a traffic capacity table.

In the exemplary embodiment, the mean transmission length has been ascertained from actual data collected during various tactical training events and has been found to approximate a constant equal to 4.5 seconds although the range is from 2.0 to 10 seconds. The duration of the peak period is solicited from the user in addition to the number of L-V bridges. A regression equation is used to predict the number of transmissions for a particular exercise given the length of the peak period and the number of bridged circuits.

Equation 2, the regression model, is derived from communications data collected during nine military training exercises:

$$y = -4706 + 1122x_2 + 0.000033x_1^2 - 0.0655x_1x_2 \quad (2)$$

Where: y=number of transmissions
$x_1$=duration of peak performance period
$x_2$=number of L-V bridges Spare Capacity After the number of relay radio resources required is estimated, spare capacity requirements are calculated. Spare capacity is vital to maintaining a QoS requirement of 0% loss, and is contrasted to the QoS for commercial systems of 1-2 percent described hereinabove. Providing spare relay radios, and thus, spare input/output (I/O) capacity, in addition to the number recommended by Erlang's loss calculation ensures sufficient access to communication resources.

Spare I/O capacity requirements for high risk operational environments typically range from 20-30%. Analysis of an actually assembled and verified DES exemplary model representing a L-V communications network, revealed that similar I/O requirements would be sufficient to provide the specified communications QoS level for LVC training environments. This method consistently overestimated the number of relay radios required to support the anticipated number of simultaneous transmissions.

Based upon the results of the DES analysis, spare I/O capacity requirements for similar systems, and safety concerns inherent to live tactical training, the spare capacity for L-V communication bridging may be in anywhere in the range above 0% but is preferably 30% or greater where the safety factors predominate.

Recommended Number of Relay Radios

FIG. 7 summarizes the results of DES experimentation for exemplary feasible use cases for the prediction heuristic. In application of the exemplary method, empirical experimentation and testing confirmed the prediction heuristic's adequacy and demonstrated the boundaries within which the exemplary method can be applied. Thirty replications of the DES were run for the following number of L-V communications bridges: 10, 15, 20, 30, 40, 50, and 60. At each level, peak period durations 2, 3, 4, 5, and 6 hours were investigated. It is to be appreciated that for situations involving greater than 40 bridges, the number of required bridges can be partitioned into subgroups with fewer than 40 bridges in each subgroup with the number of instructor circuits evenly distributed where the application involves training with instructors.

It is to be further appreciated that training exercises involving command and control environments can benefit greatly from application of the exemplary embodiment. Furthermore, This approach to predicting relay radio resources would benefit distributed exercises that require multiple sites to communicate over L-V circuits.

Crisis event training involving law enforcement and emergency services will also benefit from application of the exemplary embodiment. Examples of emergency response requiring coordination during natural disasters include simulated hurricane, wild fire, and earthquake scenarios. Another potential application would be rehearsal and preparation for hostile actions against civilian populations such as terrorist attacks and hostage situations.

In application, the embodiment presented hereinabove can be applied to determine the relay radio resource requirements for environments that share the following characteristics: live and virtual communications are bridged, transmissions are uni-directional, transmission loss is unacceptable, and the motivation for communicating is of a critical nature.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here append.

What is claimed is:

1. A method for configuring the minimum number of relay radios in a live-virtual communications system for a tactical training event, the system comprising live radios, a wide area network, virtual radios cooperating with the wide area network, and a multiplicity of radio bridge circuits cooperating between each live radio and the wide area network, each radio bridge circuit further comprising one relay radio and one bridge circuit where number of relay radios comprises the steps of:
   a. determining the mean transmission time for the tactical training event;
   b. determining the duration of peak performance for the tactical training event;
   c. determining the expected number of transmissions for the tactical training event;
   d. predicting the traffic capacity required using the relationship $$E_n(\alpha) = \frac{\alpha E_{n-1}(\alpha)}{n + \alpha E_{n-1}(\alpha)}$$

e. specifying a QoS; and
   f. specifying a spare capacity.

2. The method of claim 1 wherein the mean transmission time is between 2 and 10 seconds.

3. The method of claim 1 wherein the mean transmission length is 4.5 seconds.

4. The method of claim 1 wherein the expected number transmissions is determined by a regression model from training exercises.

5. The method of claim 4 wherein the regression model for the expected number of transmissions is $y = -4706 + 1122x_2 + 0.000033x_1^2 - 0.0655x_1x_2$.

6. The method of claim 1 wherein the QoS equals zero percent (0%) loss.

7. The method of claim 1 comprising constructing a capacity table.

8. The method of claim 1 wherein the spare capacity is greater than 0%.

9. The method of claim 1 where the spare capacity is greater than 30%.

10. The method of claim 1 wherein the spare capacity is equal to 30%.

11. The method of claim 1 wherein the expected number of transmissions is determined by the regression model $y=-4706+1122x_2+0.000033x_1^2-0.0655x_1x_2$, the QoS=0% loss, the mean transmission time is 4.5 seconds and the spare capacity is greater than 0%.

12. The method of claim 1 wherein the expected number of transmissions is determined by the regression model $y=-4706+1122x_2+0.000033x_1^2-0.0655x_1x_2$, the QoS=0% loss, the mean transmission time is 4.5 seconds and the spare capacity is greater than 20%.

13. The method of claim 1 wherein the expected number of transmissions is determined by the regression model $y=-4706+1122x_2+0.000033x_1^2-0.0655x_1x_2$, the QoS=0% loss, the mean transmission time is 4.5 seconds and the spare capacity is equal to 30%.

14. A virtual communications system for a tactical training event comprising between 11 and 40 radio bridge circuits, each bridge circuit including a relay radio, the system capable of operating for a peak duration between 3 and 6 hours with a QoS of 0% loss, wherein the minimum number of relay radios is equal to the number defined by the relationship, $$E_n(\alpha) = \frac{\alpha E_{n-1}(\alpha)}{n + \alpha E_{n-1}(\alpha)}.$$

15. The virtual communications system of claim 14 wherein the number of relay radios is determined by adding a spare capacity of greater than 20% to the number determined by the relationship, $$E_n(\alpha) = \frac{\alpha E_{n-1}(\alpha)}{n + \alpha E_{n-1}(\alpha)}.$$

16. The virtual communications system of claim 14 wherein the number of bridge circuits is determined by adding a spare capacity equal to 30% to the number determined by the relationship, $$E_n(\alpha) = \frac{\alpha E_{n-1}(\alpha)}{n + \alpha E_{n-1}(\alpha)}.$$

17. A virtual communications system for a tactical training event comprising between 11 and 20 radio bridge circuits, the system capable of operating for a peak duration equal to at least six hours with a QoS of 0% wherein the number of bridge circuits is determined by the relationship, $$E_n(\alpha) = \frac{\alpha E_{n-1}(\alpha)}{n + \alpha E_{n-1}(\alpha)}.$$

18. The virtual communications system of claim 17 wherein the number of bridge circuits is determined by adding a spare capacity of between about 20% to 30% to the number determined by the relationship $$E_n(\alpha) = \frac{\alpha E_{n-1}(\alpha)}{n + \alpha E_{n-1}(\alpha)}.$$

19. The virtual communications system of claim 17 wherein the number of bridge circuits is determined by adding a spare capacity of about 30% to the number determined by the relationship $$E_n(\alpha) = \frac{\alpha E_{n-1}(\alpha)}{n + \alpha E_{n-1}(\alpha)}.$$

* * * * *